No. 690,213. Patented Dec. 31, 1901.
C. L. WILMOT.
PIPE COUPLING.
(Application filed Mar. 28, 1901.)
(No Model.)

WITNESSES
INVENTOR
Clarence L. Wilmot
by Bakewell & Bakewell
his attys.

THE NORRIS PETERS CO., PHOTO-LITHO., WASHINGTON, D. C.

UNITED STATES PATENT OFFICE.

CLARENCE L. WILMOT, OF PITTSBURG, PENNSYLVANIA.

PIPE-COUPLING.

SPECIFICATION forming part of Letters Patent No. 690,213, dated December 31, 1901.

Application filed March 28, 1901. Serial No. 53,268. (No model.)

*To all whom it may concern:*

Be it known that I, CLARENCE L. WILMOT, of Pittsburg, in the county of Allegheny and State of Pennsylvania, have invented a new and useful Pipe-Coupling, of which the following is a full, clear, and exact description, reference being had to the accompanying drawings, forming part of this specification, in which—

Figure 1:
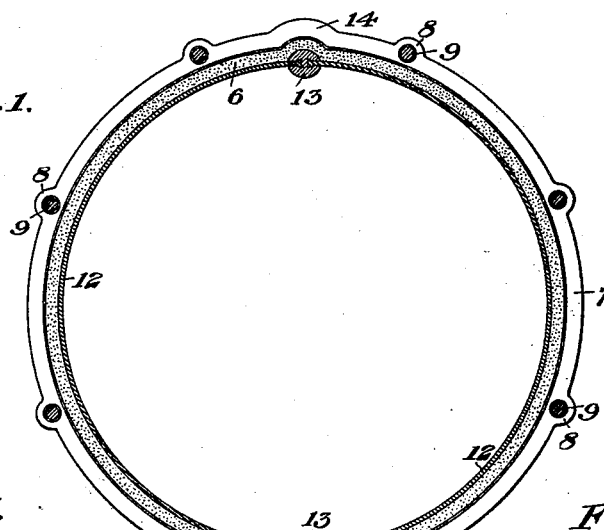
Figures 3, 4:
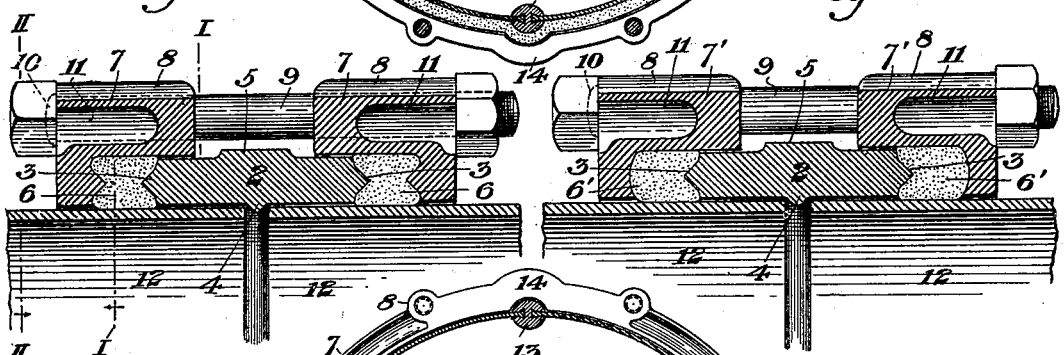
Figure 2:
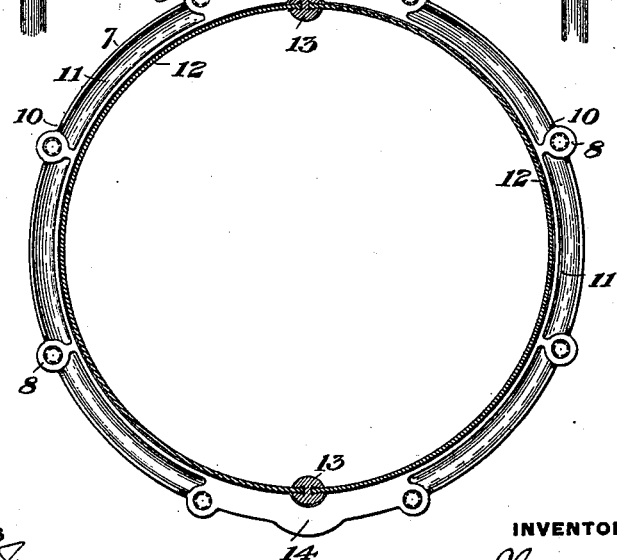

Figures 1 and 2 are cross-sections of my improved coupling as applied to rivetless pipe, being taken on the lines I I and II II, respectively, of Fig. 3. Fig. 3 is an enlarged detail longitudinal section showing a portion of the joint; and Fig. 4 is a view similar to Fig. 3, showing a modified form.

My invention relates to the couplings for joining the ends of thin or light walled tubing or pipes, and is especially designed for use with rivetless pipe, wherein the longitudinal plate or plates are secured together at their meeting edges by locking-bars, though it may be applied to any form of pipes or tubes; and its object is to provide improved mechanism for compressing the gasket or gaskets and obtaining a positive outer bearing thereon.

In the drawings, in which I show the preferred form of my invention as applied to rivetless pipe formed with locking-bars, 2 represents a fixed central ring, preferably formed of wrought-iron and having angular projections 3 3 at its edges, which I have shown as of V form. This ring is preferably provided with a central annular gaging projection 4, which serves to indicate when it has been slid to the proper place over the open end of the pipe and centers it in position over the joint. I may form this ring with a central outer rib 5 to give additional strength, though this is not necessary. At the opposite edges of this central ring 2 I provide gaskets or compressible packing-rings 6 6, having at their inner edges V-shaped annular recesses entered by the projections of the central ring 2 and at their outer edges similar recesses with which engage annular V-shaped projections on the compressing-rings 7 7. Each of these coupling-rings 7 is preferably formed in one piece, with perforated bosses 8 to receive the bolts 9, which connect the two rings, and may be prevented from turning by lugs or stops 10. To reduce the weight of these coupling-rings, they may be provided with arc-shaped recesses 11, forming a light but strong shell between the bosses.

The pipes to be connected are shown as formed of semicircular halves 12, having their edges peened up or enlarged, and secured together by locking-bars 13, of general H shape, compressed thereon, and the rings 2, 6, and 7 are provided with outwardly-bent or recessed portions 14 to receive the outer portions of the locking-bars.

In using the coupling the ring 2 is slipped over the open end of one pipe and the other pipe pushed within it, these pipes each having one of the gaskets and coupling-rings placed around it. The bolts are then thrust through the holes in the coupling-rings, and pressure being applied by the nuts the coupling-rings are drawn together, and the coacting projections and recesses of these rings and the gaskets give an even positive pressure upon the outer parts of the gaskets, forcing them against the pipe and effectively closing the joint.

In the form of Fig. 4 the coupling-rings 7' are provided with curved or U-shaped inner recesses, and the gaskets 6' are provided with corresponding projecting portions, which enter these recesses. In this form the action is substantially similar to that of the first form, the interengaging projections and recesses giving a positive inward axial pressure, which distorts the gaskets and closes the joints.

The advantages of my invention result from the peculiar arrangement of the compressing-rings and gaskets relative to each other, since the projections on the rings give the positive connection and bearing necessary to effectively compress the gaskets and inclose the joint. The coupling may be easily and cheaply made, is comparatively light, and may be applied to any form or shape of pipes or tubes.

Many variations may be made in the form and arrangement of the central spacing-ring, the gaskets, and the compressing-rings without departing from my invention.

I claim—

1. A pipe-coupling, comprising a central spacing-ring having opposite V-shaped projections, a pair of gaskets having recesses engaging said projections, a pair of coupling-rings arranged to slide upon the outer face of the spacing-ring, and having inwardly-projecting ring portions engaging the outer parts of the gaskets, and connecting-bolts extending through the coupling-rings; substantially as described.

2. A pipe-coupling comprising a central spacing-ring, having opposite V-shaped projections, a pair of gaskets having recesses engaging said projections and provided with outer recesses, and a pair of coupling-rings having annular projections entering the outer recesses of the gaskets, said coupling-rings having connecting-bolts; substantially as described.

In testimony whereof I have hereunto set my hand.

CLARENCE L. WILMOT.

Witnesses:
H. M. CORWIN,
G. B. BLEMING.